(12) United States Patent
Olsson

(10) Patent No.: US 12,316,760 B2
(45) Date of Patent: May 27, 2025

(54) PROVIDING CONNECTIVITY FOR A PLURALITY OF IoT DEVICES

(71) Applicant: ASSA ABLOY AB, Stockholm (SE)

(72) Inventor: Håkan Olsson, Hägersten (SE)

(73) Assignee: ASSA ABLOY AB, Stockholm (SE)

(*) Notice: Subject to any disclaimer, the term of this patent is extended or adjusted under 35 U.S.C. 154(b) by 815 days.

(21) Appl. No.: 17/056,704

(22) PCT Filed: Jun. 27, 2019

(86) PCT No.: PCT/EP2019/067142
§ 371 (c)(1),
(2) Date: Nov. 18, 2020

(87) PCT Pub. No.: WO2020/007701
PCT Pub. Date: Jan. 9, 2020

(65) Prior Publication Data
US 2021/0211284 A1    Jul. 8, 2021

(30) Foreign Application Priority Data

Jul. 3, 2018 (EP) .................................... 18181323

(51) Int. Cl.
*H04L 9/14* (2006.01)
*G06F 13/40* (2006.01)
(Continued)

(52) U.S. Cl.
CPC ............ *H04L 9/14* (2013.01); *G06F 13/4068* (2013.01); *H04W 12/03* (2021.01); *G16Y 30/10* (2020.01); *H04L 2209/80* (2013.01)

(58) Field of Classification Search
CPC ... H04L 9/14; H04L 2209/80; G06F 13/4068; H04W 12/03; G16Y 30/10
(Continued)

(56) References Cited

U.S. PATENT DOCUMENTS 9,451,573 B2 * 9/2016 Erickson ................ H04W 4/029
10,255,670 B1 * 4/2019 Wu ........................ H04N 7/183
(Continued)

FOREIGN PATENT DOCUMENTS

CN    103563453    2/2014
CN    107111801    8/2017
(Continued)

OTHER PUBLICATIONS

Extended Search Report for European Patent Application No. 18181323.9, dated Jan. 2, 2019, 7 pages.
(Continued)

*Primary Examiner* — Saleh Najjar
*Assistant Examiner* — Peiliang Pan
(74) *Attorney, Agent, or Firm* — Schwegman Lundberg & Woessner, P.A.

(57) ABSTRACT

It is provided a method for providing connectivity for a plurality of Internet of Things, IoT, devices. The method is performed in a connectivity device and comprises the steps of: detecting presence of a connector unit in one of a plurality of connector interfaces; obtaining connection data from the connector unit, the connection data being associated with a specific IoT device; connecting, using a wireless communication module of the connectivity device, to the IoT device using the connection data associated with the IoT device; and wherein the method is repeated for a plurality of connector units.

16 Claims, 2 Drawing Sheets

(51) Int. Cl.
*H04W 12/03* (2021.01)
*G16Y 30/10* (2020.01)

(58) Field of Classification Search
USPC .......................................................... 713/171
See application file for complete search history.

(56) References Cited

U.S. PATENT DOCUMENTS

| | | | |
|---|---|---|---|
| 10,281,080 B1* | 5/2019 | Massey | F16M 13/022 |
| 10,528,228 B2* | 1/2020 | Seixeiro | G06F 3/167 |
| 10,796,698 B2* | 10/2020 | Liddell | G06F 3/16 |
| 11,069,012 B2* | 7/2021 | Shelton, IV | H04L 9/14 |
| 11,346,493 B2* | 5/2022 | Massey | F16M 11/12 |
| 2009/0298521 A1* | 12/2009 | Finlayson | H04L 65/1033 455/500 |
| 2016/0156720 A1 | 6/2016 | Bransfield, Jr. | |
| 2016/0198536 A1* | 7/2016 | Britt | H02J 7/00 315/149 |
| 2017/0055148 A1* | 2/2017 | Zimmerman | H04L 63/0428 |
| 2017/0093868 A1 | 3/2017 | Slavov et al. | |
| 2017/0171178 A1* | 6/2017 | Reynders | G06Q 20/145 |
| 2018/0075262 A1* | 3/2018 | Auh | H04L 9/085 |
| 2018/0139648 A1 | 5/2018 | Park et al. | |
| 2018/0146367 A1* | 5/2018 | Altin | H04W 12/50 |
| 2018/0316658 A1* | 11/2018 | Bartlett | H04W 12/041 |
| 2019/0081503 A1* | 3/2019 | Kim | H04L 12/2816 |
| 2019/0109713 A1* | 4/2019 | Clark | G06F 16/182 |
| 2019/0230126 A1* | 7/2019 | Kumar | H04L 45/64 |
| 2019/0319780 A1* | 10/2019 | Teo | H04L 9/0866 |
| 2022/0252209 A1* | 8/2022 | Newville | F16M 13/02 |

FOREIGN PATENT DOCUMENTS

| | | | |
|---|---|---|---|
| EP | 3247083 | 11/2017 | |
| EP | 3322131 | 5/2018 | |
| EP | 3322131 A1 * | 5/2018 | ......... H04L 12/2803 |

OTHER PUBLICATIONS

International Search Report and Written Opinion for International (PCT) Patent Application No. PCT/EP2019/067142, dated Sep. 10, 2019, 11 pages.

International Preliminary Report on Patentability for International (PCT) Patent Application No. PCT/EP2019/067142, dated Jun. 18, 2020, 15 pages.

Shilei, Wu, "Research on NB-IoT Low Speed Narrowband IoT Communication Technology", Information and Communications, No. 05 with English translation, (May 15, 2018), 9 pages.

* cited by examiner

PROVIDING CONNECTIVITY FOR A PLURALITY OF IoT DEVICES

CROSS REFERENCE TO RELATED APPLICATIONS

This application is a national stage application under 35 U.S.C. 371 and claims the benefit of PCT Application No. PCT/EP2019/067142 having an international filing date of Jun. 27, 2019, which designated the United States, which PCT application claimed the benefit of European Patent Application No. 18181323.9 filed Jul. 3, 2018, the disclosure of each of which are incorporated herein by reference.

TECHNICAL FIELD

The invention relates to a method, a connectivity device, a computer program and a computer program product for providing connectivity for a plurality of Internet of Things (IoT) devices.

BACKGROUND

Presently, the concept of Internet of Things (IoT) is quickly gaining relevance. In IoT, a multitude of electronic devices all require network access. The network access can be used for the device to report data and/or to allow control of the device by another device.

With IoT, the number of devices is set to increase greatly. Each person will become responsible for more and more devices. An issue is how all of these devices are to be configured, especially since it is often desired not to need to provide a user interface with every single device. Moreover, security is needed to ensure that no unauthorised party gains access to the device.

SUMMARY

It is an object to provide a simpler way to provide connectivity for a plurality of IoT devices.

According to a first aspect, it is provided a method for providing connectivity for a plurality of Internet of Things, IoT, devices. The method is performed in a connectivity device and comprises the steps of: detecting presence of a connector unit in one of a plurality of connector interfaces; obtaining connection data from the connector unit, the connection data being associated with a specific IoT device; connecting, using a wireless communication module of the connectivity device, to the IoT device using the connection data associated with the IoT device; and wherein the method is repeated for a plurality of connector units.

The step of detecting presence may comprise detecting a physical contact between the connector unit and one of the plurality of connector interfaces.

The connection data may be associated with a set of at least two specific IoT devices, in which case the step of connecting comprises connecting to all of the IoT devices in the set.

The connection data may be based on a secret key stored in the connector unit.

The secret key may be part of a cryptographic key pair.

The connectivity device may support a plurality of wireless communication protocols, in which case the step of connecting comprises selecting a wireless communication protocol based on the connection data.

The method may further comprise the step of: providing, when a connection with an IoT device is established, an indication indicating successful connection adjacent to the associated connector unit.

The method may further comprise the step of: co-ordinating communication with the plurality of IoT devices to reduce interference.

According to a second aspect, it is provided a connectivity device for providing connectivity for a plurality of Internet of Things, IoT, devices. The connectivity device comprises: a plurality of connector interfaces; a wireless communication module; a processor; and a memory storing instructions that, when executed by the processor, cause the connectivity device to detect presence of a connector unit in one of the plurality of connector interfaces; obtain connection data from the connector unit, the connection data being associated with a specific IoT device; and connect, using the wireless communication module of the connectivity device, to the IoT device using the connection data associated with the IoT device; wherein the instructions to detect presence, obtain connection data and connect are repeated for a plurality of connector units.

The instructions to detect presence may comprise instructions that, when executed by the processor, cause the connectivity device to detect a physical contact between the connector unit and one of the plurality of connector interfaces.

The connection data may be associated with a set of at least two specific IoT devices, in which case the instructions to connect comprise instructions that, when executed by the processor, cause the connectivity device to connect to all of the IoT devices in the set.

The connection data may be based on a secret key stored in the connector unit.

The secret key may be part of a cryptographic key pair.

The connectivity device may support a plurality of wireless communication protocols, in which case the instructions to connect comprise instructions that, when executed by the processor, cause the connectivity device to select a wireless communication protocol based on the connection data.

The connectivity device may further comprise instructions that, when executed by the processor, cause the connectivity device to: provide, when a connection with an IoT device is established, an indication indicating successful connection adjacent to the associated connector unit.

The connectivity device may further comprise instructions that, when executed by the processor, cause the connectivity device to: co-ordinate communication with the plurality of IoT devices to reduce interference.

According to a third aspect, it is provided a system comprising the connectivity device according to the second aspect and a plurality of connectivity units configured to be provided respectively in the connector interfaces of the connectivity device.

According to a fourth aspect, it is provided a computer program for providing connectivity for a plurality of Internet of Things, IoT, devices. The computer program comprising computer program code which, when run on a connectivity device causes the connectivity device to: detect presence of a connector unit in one of a plurality of connector interfaces; obtain connection data from the connector unit, the connection data being associated with a specific IoT device; and connect, using a wireless communication module of the connectivity device, to the IoT device using the connection data associated with the IoT device; wherein the program code to detect presence, obtain connection data and connect are repeated for a plurality of connector units.

According to a fifth aspect, it is provided a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein relate to providing connectivity for a plurality of IoT devices. This is achieved by each IoT device being provided with a corresponding connector unit. Each connector unit comprises respective hard-coded connection data for a specific IoT device. Each connector unit is physically connected to a respective connector interface of a connectivity device. The connectivity device establishes a wireless connection with the respective IoT device using the connection data. In this way, connectivity for an IoT device is established by a user by simply placing the connector unit in the connector interface of the connectivity device.

Figure 1:
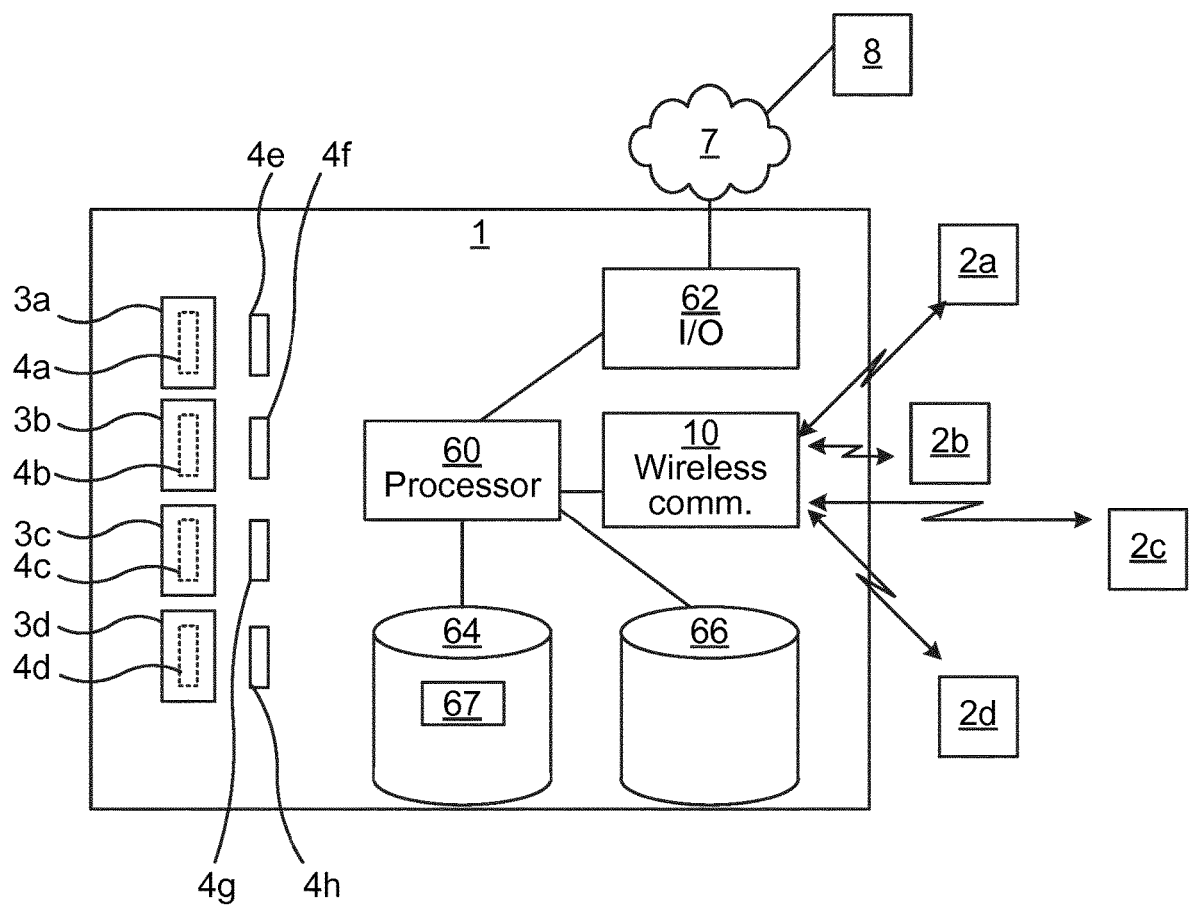
FIG. 1 is a schematic diagram illustrating an environment in which embodiments presented herein can be applied to provide connectivity for a plurality of IoT devices.

FIG. 1 is a schematic diagram illustrating an environment in which embodiments presented herein can be applied to provide connectivity for a plurality of IoT devices.

There are a number of IoT devices 2a-d for which communication needs to be established. In this example, there are four IoT devices 2a-d, but there can be more or fewer IoT devices than shown here.

The IoT devices need to communicate with a computer 8, which can be a remote or local computer, such as a server, a desktop computer, a laptop computer, a tablet computer, a smartphone, a mobile phone or a wearable device. The connection between the IoT device 2a-d and the computer 8 can be used to report data to the computer sensed by the IoT device 2a-d or for the computer 8 to control/actuate some aspect of the IoT device 2a-d.

A connectivity device 1 is provided to provide connectivity for the plurality of IoT devices 2a-d to one or more computers 8, via a communication network 7. The communication network can comprise local communication, e.g. over Wi-Fi, Ethernet or Bluetooth and/or remote communication, e.g. over the Internet.

The connectivity device 1 comprises a processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 2 below.

The memory 64 can be any combination of random-access memory (RAM) and/or read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

A wireless communication module 10 supports one or more wireless protocols, such as any one or more of Bluetooth or Bluetooth Low Energy (BLE), ZigBee, any of the IEEE 802.11x standards (also known as WiFi), etc. The wireless communication module 10 is used in communication with the IoT devices 2a-d.

The connectivity device 1 further comprises an I/O interface 62 for communicating via the communication network 7, e.g. to provide connection to the computer(s) 8. The connectivity device 1 can be configured e.g. using a web interface provided by the connectivity device 1 or using a physical user interface on the connectivity device 1, such as a touch screen.

The connectivity device 1 further comprises a plurality of connector interfaces 4a-h. The connector interfaces 4a-h are physical interfaces for accepting respective connector units 3a-d. For instance, the connector interfaces 4a-h can be USB (Universal Serial Bus) or FireWire based interfaces. Each connector unit 3a-d is associated with a specific IoT device 2a-d. In this example, there are four connector units 3a-d physically connected with respective connector interfaces 4a-d. In the example of FIG. 1, there is a total of eight connector interfaces 4a-h, whereby there are here four unoccupied connector interfaces 4e-h. It is to be noted that the connectivity device 1 can be provided with any suitable number of connector interfaces.

Optionally, instead of one interface for each connector unit, there is one physical connector interface, to which connector units 3a-d are daisy chained. The connector units 3a-d can be daisy chained e.g. by stacking connector units on top of each other, such that each higher connector unit is connected either to the physical connector interface, or to a daisy chain interface corresponding to the physical connector interface, wherein the daisy chain interface is provided on the upper part of a connector unit immediately below.

Figure 2:
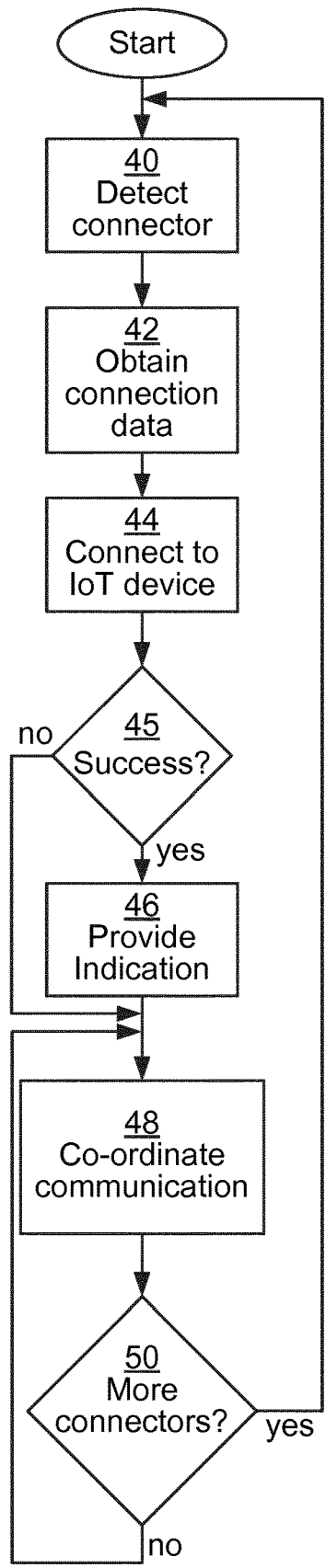
FIG. 2 is a flow chart illustrating methods for providing connectivity for a plurality of IoT devices.

Each connector unit 3a-d is hard-coded with its IoT device 2a-d, and contains a memory storing connection data which can be used by the connectivity device 1 for connecting to the IoT device 2a-d. Hence, the connection data of each connector unit reflects the association with a specific IoT device. The connection data can be stored as a read-only piece of data. In other words, the connection data can be a static piece of data. This allows the connectivity device 1 to provide connectivity for the respective IoT devices 2*a-d* only when its associated connector unit 3*a-d* is in physical contact with the connector interfaces 4*a-d* to allow the respective connection data to be read. FIG. 2 is a flow chart illustrating methods for providing connectivity for a plurality of IoT devices. The method is performed in the connectivity device of FIG. 1.

In a detect connector step 40, the connectivity device detects a presence of a connector unit in one of a plurality of connector interfaces. The detecting presence can comprise detecting a physical contact between the connector unit 3*a-d* and one of the plurality of connector interfaces. The physical contact can be used for transfer of communication signals between the connector interface and a connected connector unit. Additionally, the physical contact can be used for powering a connected connector unit via the connector interface.

By relying on the physical contact (e.g. galvanic contact) between the connector interface and the connector unit, there is no (or negligible) problem of interference when communicating with several connector units. By powering the connector unit by the connectivity device, the need for a separate power supply for the connector unit is eliminated.

In an obtain connection data step 42, the connectivity device obtains connection data from the connector unit. The connection data is associated with a specific IoT device. The connector unit is hard-coded with connection data for the specific IoT device. By hard-coding the connection data in the connector unit, the user experience is made very convenient. The user does not have to configure anything; it is sufficient to simply physically connect the connector unit in the connector interface. In other words, this solution provides zero configuration connectivity for when a new IoT device is to be installed, which is particularly useful for IoT devices, since these often have a minimal user interface or no user interface at all.

Optionally, the connection data is associated with a set of at least two specific IoT devices. The connection data can contain (at least partly) separate connection parameters for the different IoT devices in the set.

In a connect to IoT device step 44, the connectivity device connects, using the wireless communication module of the connectivity device, to the IoT device using the connection data associated with the IoT device. The connection data may be based on a secret key stored in the connector unit. For instance, the secret key can form part of a cryptographic key pair. This can e.g. be used such that the connection data first comprises a section with an identifier of the IoT device. The connectivity device starts a handshake with the IoT device, in which the IoT device provides a piece of data to be signed by the connector unit. The connectivity device provides the piece of data to the connector unit for signing and forwards the signature to the IoT device. At this stage, the IoT device can verify the signature (e.g. using a public key of the cryptographic key pair), which proves that the connectivity device is in connection with the connector unit and a connection is established.

Optionally, the connectivity device supports a plurality of wireless communication protocols. In such a case, this step comprises selecting a wireless communication protocol which can be indicated in the connection data. In other words, the connection data can comprise different sections.

When the connection data is associated with a set this step comprises connecting to all of the IoT devices in the set.

In an optional conditional success step 45, the connectivity device the connectivity device determines whether the connection with the IoT device was established. If this is the case, the method proceeds to an optional provide indication step 46, otherwise, the method proceeds to an optional co-ordinate communication step 48.

In the optional provide indication step 46, the connectivity device provides an indication indicating successful connection adjacent to the associated connector unit or on the associated connector unit. For instance, user interface element, such as a green LED (Light Emitting Diode), can be activated when the connection is successful. This allows the user to verify that the IoT device is connected. The user interface element can be provided on the connectivity device, adjacent to the connector interface. Alternatively or additionally, the user interface element is provided on the connector unit.

In the optional co-ordinate communication step 48, the connectivity device co-ordinates communication with the plurality of IoT devices to reduce interference. The connectivity device does not need to be battery powered; it can be powered from a mains network. Additionally, the connectivity device does not need to be very restricted in size since it does not need to be mobile after installation. Hence, the connectivity device can monitor the radio environment to adapt communication with the IoT devices to avoid interference. This can be used both to reduce interference affecting the communication with the IoT devices and to reduce interference from the communication with the IoT devices affecting other communication.

In a conditional more connectors step 50, the connectivity device determines whether there are any more connectors for which communication with a corresponding IoT device has not been established. If this is the case, the method returns to the detect connector step 40. Otherwise, the method returns to the optional co-ordinate communication step 48 or, when step 48 is not performed the method re-performs step 50, optionally after a delay.

Once the connection with the IoT devices is established, the connectivity device can function as a router to provide a connection path between the IoT device and the computer (see 8 of FIG. 1).

The method will be illustrated in a scenario now. A user has a connectivity device at her home and purchases a new IoT device. The new IoT device is packaged with a connector unit. The user unpacks the IoT device and inserts the connector unit in an unoccupied connector interface of the connectivity device. The connectivity device communicates with the connector unit and the IoT device to thus establish a connection for the IoT device. The IoT device is now installed and communicate with a corresponding computer for monitoring and/or actuating purposes. If the user sells or gives away the IoT device, the connector unit will follow the IoT device. The new owner can then rest assured that the previous owner is unable to communicate with the IoT device, since the IoT device is hardcoded to communicate only when its connector unit is connected to a connectivity device (now at the premises of the new owner).

Embodiments presented herein can be used to provide connectivity for IoT devices in a simple and secure way. There is no need for a user interface on the IoT device. The connector units do not need to have any wireless communication ability and can thus be produced at low cost.

Figure 3:
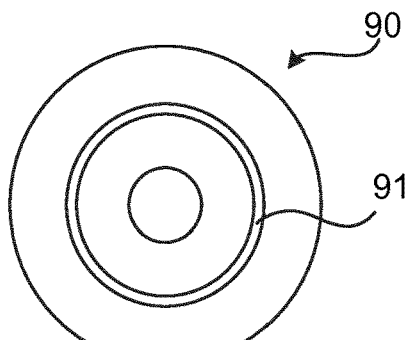
FIG. 3 shows one example of a computer program product 90 comprising computer readable means.

FIG. 3 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 1. While the computer program 91 is here schematically shown as a track on the depicted optical disk, the computer program can be stored in any way which is suitable for the computer program product, such as a removable solid-state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for providing connectivity for a plurality of Internet of Things, IoT, devices, the method being performed in a connectivity device comprising a plurality of connector interfaces, the method comprising:
   detecting presence of a connector unit in one of a plurality of connector interfaces, which comprises detecting a physical contact between the connector unit and one of the plurality of connector interfaces, wherein the connector unit is associated with a specific IoT device;
   obtaining connection data from the physically connected connector unit, the connection data being associated with a specific IoT device; and
   connecting, using a wireless communication module of the connectivity device, to the IoT device using the connection data associated with the IoT device;
   wherein the method is repeated for a plurality of connector units.

2. The method according to claim 1, wherein the connection data is associated with a set of at least two specific IoT devices, and wherein connecting comprises connecting to all of the IoT devices in the set.

3. The method according to claim 1, wherein the connection data is based on a secret key stored in the connector unit.

4. The method according to claim 3, wherein the secret key is part of a cryptographic key pair.

5. The method according to claim 1, wherein the connectivity device supports a plurality of wireless communication protocols, and wherein connecting comprises selecting a wireless communication protocol based on the connection data.

6. The method according to claim 1, further comprising:
   providing, when a connection with an IoT device is established, an indication indicating successful connection adjacent to the associated connector unit.

7. The method according to claim 1, further comprising:
   co-ordinating communication with the plurality of IoT devices to reduce interference.

8. A connectivity device for providing connectivity for a plurality of Internet of Things, IoT, devices, the connectivity device comprising:
   a plurality of connector interfaces;
   a wireless communication module;
   a processor; and
   a memory storing instructions that, when executed by the processor, cause the connectivity device to:
      detect presence of a connector unit in one of the plurality of connector interfaces which comprises to detect a physical contact between the connector unit and one of the plurality of connector interfaces, wherein the connector unit is associated with a specific IoT device;
      obtain connection data from the physically connected connector unit, the connection data being associated with a specific IoT device; and
      connect, using the wireless communication module of the connectivity device, to the IoT device using the connection data associated with the IoT device;
      wherein the instructions to detect presence, obtain connection data and connect are repeated for a plurality of connector units.

9. The connectivity device according to claim 8, wherein the connection data is associated with a set of at least two specific IoT devices, and wherein the instructions to connect comprise instructions that, when executed by the processor, cause the connectivity device to connect to all of the IoT devices in the set.

10. The connectivity device according to claim 8, wherein the connection data is based on a secret key stored in the connector unit.

11. The connectivity device according to claim 10, wherein the secret key is part of a cryptographic key pair.

12. The connectivity device according to claim 8, wherein the connectivity device supports a plurality of wireless communication protocols, and wherein the instructions to connect comprise instructions that, when executed by the processor, cause the connectivity device to select a wireless communication protocol based on the connection data.

13. The connectivity device according to claim 8, further comprising instructions that, when executed by the processor, cause the connectivity device to: provide, when a connection with an IoT device is established, an indication indicating successful connection adjacent to the associated connector unit.

14. The connectivity device according to claim 8, further comprising instructions that, when executed by the processor, cause the connectivity device to: co-ordinate communication with the plurality of IoT devices to reduce interference.

15. A system comprising the connectivity device according to claim 8 and a plurality of connectivity units configured to be provided respectively in the connector interfaces of the connectivity device.

16. A non-transitory computer-readable medium comprising a computer program stored thereon for providing connectivity for a plurality of Internet of Things, IoT, devices, the computer program comprising computer program code which, when run on a connectivity device causes the connectivity device to:
   detect presence of a connector unit in one of a plurality of connector interfaces which comprises to detect a physical contact between the connector unit and one of the plurality of connector interfaces, wherein the connector unit is associated with a specific IoT device;
   obtain connection data from the physically connected connector unit, the connection data being associated with a specific IoT device; and
   connect, using a wireless communication module of the connectivity device, to the IoT device using the connection data associated with the IoT device;
   wherein the program code to detect presence, obtain connection data and connect are repeated for a plurality of connector units.

* * * * *